(12) United States Patent
Schmalzhofer et al.

(10) Patent No.: US 6,712,540 B2
(45) Date of Patent: Mar. 30, 2004

(54) PROFILE-CONNECTING DEVICE

(75) Inventors: Rainer Schmalzhofer, Eppingen (DE); Wilfried Schuhmacher, Guglingen (DE)

(73) Assignee: FMS Forder- und Montage-Systeme Schmalzhofer GmbH, Eppingen-Muhlbach (DE)

( * ) Notice: Subject to any disclaimer, the term of this patent is extended or adjusted under 35 U.S.C. 154(b) by 0 days.

(21) Appl. No.: 10/202,448

(22) Filed: Jul. 25, 2002

(65) Prior Publication Data
US 2003/0036314 A1 Feb. 20, 2003

Related U.S. Application Data

(63) Continuation of application No. PCT/DE00/00245, filed on Jan. 28, 2000.

(51) Int. Cl.$^7$ .................................................. F16B 7/04
(52) U.S. Cl. .................... 403/248; 403/252; 403/374.1; 403/374.3; 403/381; 403/387; 403/409.1; 52/655.1
(58) Field of Search ................................ 403/169, 170, 403/187, 188, 217, 252, 243, 248, 255–261, 263, 264, 297, 314, 374.1, 374.3, 375, 380–383, 408.1, 409.1, 374.2, 387; 52/222, 655.1; 211/182, 189–191; 312/265.1, 265.2–265.4; 411/55, 84

(56) References Cited

U.S. PATENT DOCUMENTS 5,173,001 A * 12/1992 Schunke .................. 403/252
6,382,866 B1 * 5/2002 Zihlmann .................. 403/255

FOREIGN PATENT DOCUMENTS

| DE | 12 648 74 | | 3/1968 | |
| DE | 88 11 732 | | 4/1989 | |
| DE | 91 11 163 | U1 | 1/1992 | |
| DE | 40 30 978 | A1 | 4/1992 | |
| DE | 41 42 273 | A1 | 7/1993 | |
| DE | 42 10 456 | A1 | 10/1993 | |
| DE | 43 362 82 | A1 | 4/1995 | |
| DE | 295 03 204 | U1 | 8/1996 | |
| DE | 195 20 892 | A1 | 12/1996 | |
| DE | 196 04 665 | A1 | 8/1997 | |
| DE | 196 23 870 | C1 | 10/1997 | |
| DE | 297 22 124 | U1 | 4/1998 | |
| DE | 298 14 153 | | 1/1999 | ............. F16B/7/04 |
| EP | 0 233 525 | B1 | 10/1989 | |
| EP | 0 460 360 | B1 | 9/1993 | |
| EP | 0 641 940 | A2 | 3/1995 | |
| EP | 1061272 | A1 * | 12/2000 | |

* cited by examiner

*Primary Examiner*—Lynne H. Browne
*Assistant Examiner*—Victor MacArthur
(74) *Attorney, Agent, or Firm*—Darby & Darby

(57) ABSTRACT

A profile-connecting device for connecting two profile bars. The first profile bar has an end side which abuts a longitudinal side of a second profile bar. At least the outer longitudinal side of the second profile bar which is directed toward the end side of the first profile bar and at least one outer longitudinal side of the first profile bar has an undercut groove.

14 Claims, 1 Drawing Sheet

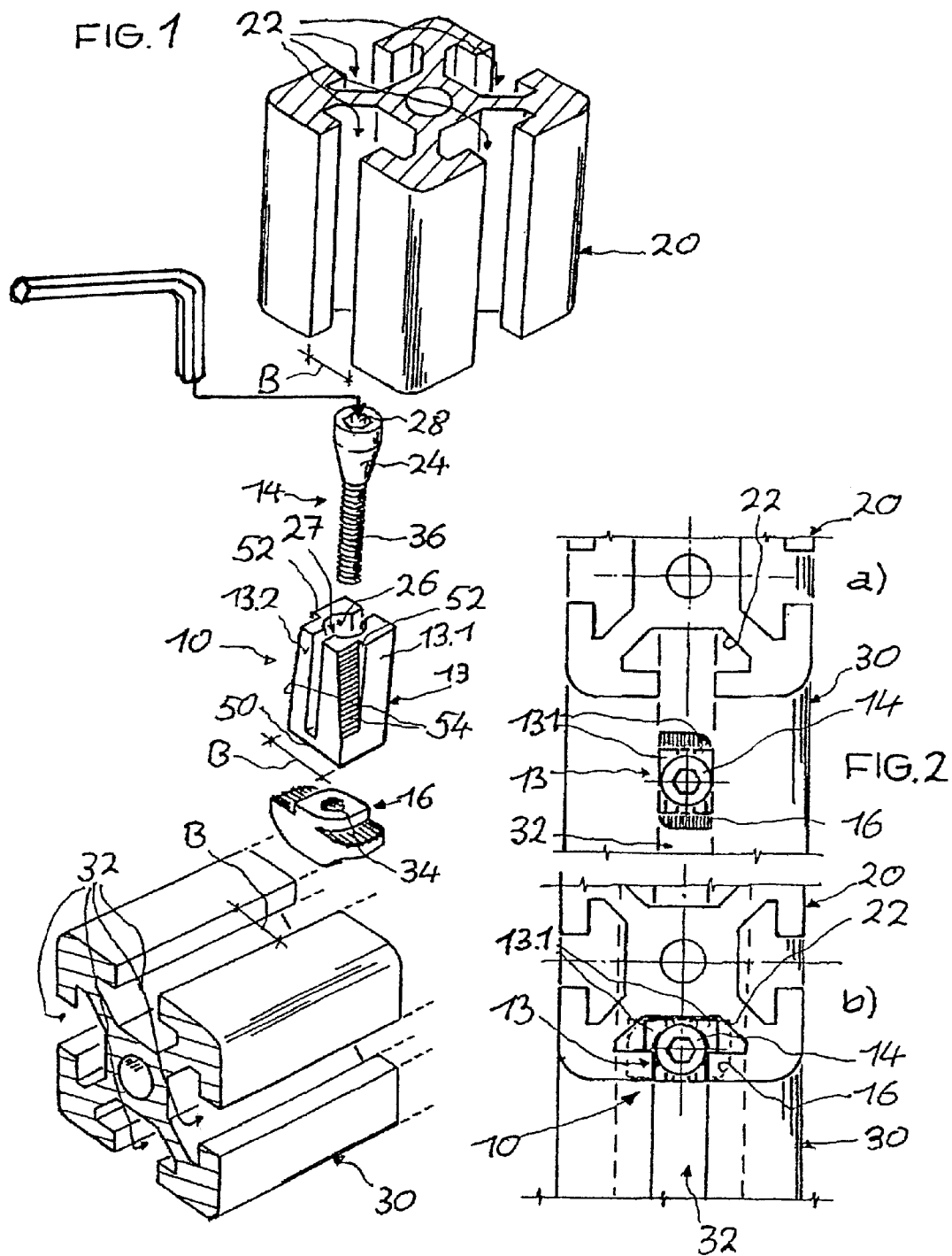

PROFILE-CONNECTING DEVICE

This is a continuation of international application Ser. No. PCT/DE00/00245, filed Jan. 28, 2000, which was published in German.

TECHNICAL FIELD

The present invention relates to a profile-connecting device for connecting two profile bars, in particular made of light metal, of which a first profile bar has an end side butting against a longitudinal side of a second profile bar, at least that outer longitudinal side of the second profile bar which is directed toward the end side of the first profile bar and at least one outer longitudinal side, in particular two mutually opposite outer longitudinal sides, of the first profile bar having an undercut groove.

Such profile bars, in particular in the form of aluminum profile bars, with outer grooves are frequently joined together in the industrial sector to form load-bearing structures for equipment.

PRIOR ART

For the assembly of aluminum profiles, a number of connections in the case of which at least one profile, in some cases both profiles, have to be machined, i.e. provided with bores or milled recesses, are known. In addition to the machining costs, the profile elements provided are often difficult and thus expensive to produce.

In addition, the profile machining usually weakens the strength of the profiles precisely in the connection region. In the case of some of the known connections, the tightening or connecting moment is non-uniform and thus is not optimum.

The self-tapping screws used for a fair number of profile-connecting devices shift the machining problem to the assembly stage.

EP-B1-0 460 360 discloses a profile-connecting device of the type mentioned in the introduction. In this case, a flange is connected to at least one sliding block, which is screwed in an inner chamber of the first profile bar via a screw. In the axial direction of the groove of the first profile bar, the flange is then screwed, via a screw-connection element, to sliding blocks arranged in the groove of the second profile bar.

EP-0 233 525 also discloses a profile-connecting device which uses a flange which is screwed in the inner chamber of the first profile via a screw, an arresting part having been introduced in the inner chamber beforehand and secured there in a form-fitting and/or force-fitting manner.

DESCRIPTION OF THE INVENTION

Taking the abovementioned prior art as the departure point, the technical problem or the object on which the present invention is based is to avoid the disadvantages specified in the prior art and to specify a profile connector which ensures a stable connection between the profiles with a uniform tightening or retaining moment without any machining of the profiles. An additional intention is to allow quick installation of the connection, which can be introduced directly in the connection region without preliminary machining of the profiles being necessary.

A further technical problem is to specify a profile-connecting device which can also be introduced subsequently into an existing structure without the existing structure having to be dismantled.

The profile-connecting device according to the invention is provided by the features of independent claim 1. Advantageous configurations and developments form the subject matter of the dependent claims.

Accordingly, the profile-connecting device according to the invention of the type mentioned in the introduction is characterized by a clamping unit which, at least in certain regions, has an outer contour which can be clamped in the groove by virtue of being widened, a screw unit which can be introduced into a continuous cutout of the clamping unit, and a threaded unit which can be introduced with rear-engagement action into the groove of the second profile bar, the clamping unit being spread apart, and thus clamped in the groove of the first profile bar, by virtue of the screw unit, which is introduced into the clamping unit, being screwed into the threaded unit, and a partially clamping and partially form-fitting connection between the two profile bars being produced in conjunction with the threaded unit, via the screw unit.

A particularly advantageous development of the profile-connecting device according to the invention is distinguished in that the screw unit is designed as a wedge screw with flanks which are inclined in certain regions, and the clamping unit has correspondingly inclined mating flank regions, a particularly advantageous configuration being distinguished in that the inner contour of the mating flank regions of the clamping unit is formed with a self-locking slope, this making it possible to ensure a permanently reliable connection.

A particularly preferred alternative configuration is distinguished in that the clamping unit has a base plate with a width which corresponds to the groove width of the profile bar, and at least two clamping elements, which can be spread apart by the threaded unit, are integrally formed on the base plate, flush with the outside of the latter, with the result that, in the non-spread-apart state, the clamping unit can be pushed at least into the groove of the first profile bar and/or, in certain regions, into the groove of the second profile bar. Since the clamping unit has the same width as the groove of the profile bar, screwing the screw unit into the threaded unit, in addition to the spreading action, causes the profiles to be centered automatically as soon as the screw connection engages with the threaded unit, which may preferably be a hammer nut.

A configuration which is particularly preferred in terms of production and straightforward handling is distinguished in that the clamping elements each have a shoulder which, in the inserted and spread-apart state of the clamping unit, engages, at least in certain regions, behind the groove of the first profile bar, and, in one development, the shoulder depth increases from the base plate to the opposite end region of the clamping elements, that is to say it is possible to set a very high clamping pressure, when the clamping unit is spread apart, in the regions adjoining the base plate.

The regions which, in the inserted and spread-apart state, butt against the groove wall within the opening width contain knurling, as a result of which the clamping force can be reliably increased.

A possible material for the clamping unit and/or centering unit is preferably an aluminum/zinc pressure die casting or steel.

The clamping unit and/or centering unit may also be in the form of a precision forging.

As the threaded unit, use is preferably made of a hammer nut or of a sliding block, in particular a spring-activated sliding block.

A configuration which is advantageous particularly in terms of the connection forces and moments transmitted is distinguished in that in each case one clamping unit with centering and screw unit is arranged in the two mutually opposite grooves of the first profile unit, the screw unit being screwed into in each case one threaded unit or, alternatively, into a common threaded unit, which has two bores corresponding to the spacing between the two grooves.

Straightforward and quick installation is further assisted, in an advantageous configuration, in that the screw unit, on the top side, has a contour for the engagement of a tool, which contour is preferably in the form of a polygonal socket contour.

Further embodiments and advantages of the invention can be gathered from the features additionally given in the claims and from the exemplary embodiments specified hereinbelow. The features of the claims may be combined with one another in any desired manner provided that they are not obviously mutually exclusive.

BRIEF DESCRIPTION OF THE DRAWING

The invention and advantageous embodiments and developments of the same are explained and described in more detail hereinbelow with reference to the example illustrated in the drawing. The features which can be gathered from the description and the drawing can be used according to the invention individually or in any desired combination. In the drawing:

FIG. 1 shows an exploded schematic illustration, in perspective, of a clamping unit with screw unit and threaded unit for connecting a first and a second profile bar (detailed), and FIGS. 2a) and b) show schematic sectional illustrations through the first profile bar with a plan view of the clamping unit according to FIG. 1 in the groove of the second profile bar in the inserted state a) and in the spread-apart, connecting state b).

METHODS OF IMPLEMENTING THE INVENTION

FIG. 1 illustrates two profile bars 20, 30 which are connected to one another at right angles. A first profile bar 20, coming from the top, has its end side connected to an outer surface of a profile bar 30, which is arranged horizontally in FIG. 1. Both profile bars 20, 30 are in the form of aluminum profile bars which have a square outer peripheral contour, a respective longitudinally continuous groove 22 or 32 being provided on each outer side.

The connection takes place via a profile-connecting device 10, which is constructed as follows:

First of all each profile-connecting device 10 has a clamping unit 13, which has two clamping elements 13.1, 13.2.

In their top region, the clamping elements 13.1 have an inwardly inclined mating flank region 26. With the elements 13.1, 13.2 inserted into the groove 22, it is possible to introduce between the two clamping elements 13.1, 13.2 a screw unit 14 which has an external thread 36, is designed as a wedge screw and has flanks 24 which are likewise inclined correspondingly to the mating flank regions 26 of the clamping elements 13.1, 13.2 and, in the inserted state, come into abutment with the mating flanks 26.

The head of the screw unit 14, on the top side, has a hexagonal socket contour 28 for the engagement of a tool.

The profile-connecting device 10 also has a threaded unit 16 which, in the exemplary embodiment, is designed as a known hammerhead nut with an internal thread 34 and can be inserted into the groove 32 of the second profile bar 30, with rear engagement of the groove 32.

In an exemplary embodiment which is not illustrated, use is made of a threaded element which passes through the entire groove 32 and, corresponding to the spacing between the two screw units and/or the grooves 22 of the first profile bar, has bores with threads at the same spacing.

The clamping unit 13, on the underside, has a base plate 50 of width B which corresponds to the groove width B of the first profile bar 20 and of the second profile bar 30. The two separate clamping elements 13.1 are integrally formed on the top side of the base plate 50, and do not project beyond the width B. These two clamping units 13.1, in their interior, form a continuous cutout 27 with a corresponding mating flank 26 for the flank 24 of the screw-connection unit 14.

The clamping elements 13.1, 13.2, on the outside, have a shoulder 52 which increases in depth from the base plate 50 to the mutually opposite end border. This results in an inclined surface which, according to the exemplary embodiment illustrated, contains transverse ribs or knurling 54.

As threaded unit 16, use is made of a hammer nut 16, which is known as such and can then easily be inserted into groove 32 of the second profile bar 30. By virtue of the screw unit 14 being turned, the hammer nut 16 initially turns along with it and then swings round in the groove 32 of the second profile bar 30.

The screw-connection unit 14, the clamping unit 13 and the threaded unit 16 can form a preassembled installation unit by virtue of the screw-connection unit 14 being screwed into the internal thread 34 of the threaded unit 16 to a slight extent, with the result that the clamping elements 13.1 of the clamping unit 13 are not spread apart. In this preassembled state, it is possible for the connecting device 10, with the hammer nut 16 in an appropriate position, to be introduced into the groove 32. This position is illustrated in FIG. 2a). Since, in this state, the base plate 50 engages, in certain regions, in the groove 32 of the second profile bar 30, a certain centering action has already been provided for in this preassembled state. The connecting device 10 is then pushed along the groove 32 into the groove 22 of the first profile bar. This is possible since the outer dimensions of the clamping unit 13 do not exceed the dimensions of the groove. If the screw-connection unit 14 is then turned, the hammer nut 16 initially turns in the groove 32 until, finally, it swings round. Further turning of the screw-connection unit 14 forces the flank 24 of the latter onto the corresponding mating surface 26 of the clamping elements 13.1, as a result of which said clamping elements 13.1 are spread apart laterally. In the final spread-apart state of the clamping elements 13.1, the arrangement is such that the two stop surfaces 52 engage, at least in certain regions, behind the inner wall of the groove 22, with the result that, in this state, it is no longer possible, as a result of the form fit, for the connecting device 10 to be drawn out of the groove 22. At the same time, the clamping elements 13.1 of the clamping unit 13 are forced apart from one another, with the result that those surfaces of the clamping elements 13.1 which are located in front of the shoulder 52 in each case are pressed with clamping action, by way of the knurling 54, against the wall of the opening of the groove 22.

The profile-connecting device 10 illustrated provides an assembly aid by means of which two profile bars 20, 30, with grooves 22, 32, which are positioned perpendicularly one upon the other are connected reliably and in the case of which it is not necessary for installation parts to be introduced from the free end sides of the groove 22 or 32 or for possible bores to be produced. The assembly operation is extremely straightforward and a permanently reliable connection is ensured.

We claim:

1. A profile-connecting device for connecting two profile bars of which a first profile bar having an end side which abuts a longitudinal side of a second profile bar, at least an outer longitudinal side of the second profile bar which is directed toward the end side of the first profile bar and at least one outer longitudinal side of the first profile bar having an undercut groove, said profile-connecting device comprising:

a clamping unit having at least two clamping elements which are spread apart by a first threaded unit, said clamping unit, at least in certain regions, having an outer contour which is clampable in the undercut groove upon being widened by the first threaded unit, a second threaded unit which engages the groove of the second profile bar from a rear position, the clamping elements being spread apart from a substantially closed position to an open spread-apart position so as to be clamped in the undercut groove of the first profile bar by the first threaded unit which is introduced into the clamping unit, being screwed into the second threaded unit, and a connection between the first and second profile bars being produced in conjunction with the threaded unit, via the first threaded unit, wherein the clamping unit has a base plate with a width (B) which corresponds to the groove width (B) of the profile bar, and said clamping elements are integrally formed with the base plate, directly abutting with the outside of the latter such that, in the substantially closed position, the clamping unit is at least pushable into the groove of the first profile bar from a front side of the first profile bar.

2. The profile-connecting device as claimed in claim 1, wherein the first threaded unit is configured as a wedge screw having flanks which are inclined in certain regions, and the clamping unit has correspondingly inclined mating flank regions.

3. The profile-connecting device as claimed in claim 1, wherein the clamping elements each have a shoulder with a shoulder width which, in the inserted position of the clamping unit, engages behind the groove of the first profile bar at least in certain regions.

4. The profile-connecting device as claimed in claim 3, wherein the shoulder width increases from the base plate to an opposite end region of the clamping elements.

5. The profile-connecting device as claimed in claim 1, wherein sub-regions of the clamping units which are arranged in a region of an opening of the undercut groove in an inserted state contain knurling.

6. The profile-connecting device as claimed in claim 1, wherein the clamping unit comprises aluminum/zinc pressure die castings.

7. The profile-connecting device as claimed in claim 1, wherein the clamping unit consists of steel.

8. The profile-connecting device as claimed in claim 1, wherein the clamping unit is precision forged.

9. The profile-connecting device as claimed in claim 1, wherein the second threaded unit is configured as a hammer nut.

10. The profile-connecting device as claimed in claim 1, wherein the second threaded unit is configured as a sliding block.

11. The profile-connecting device as claimed in claim 10, wherein the sliding block is a spring activated sliding block.

12. The profile-connecting device as claimed in claim 1, wherein a top side of the first threaded unit has a contour for engagement of a tool.

13. The profile-connecting device as claimed in claim 12, wherein the contour is a polygonal socket contour.

14. The profile-connecting device as claimed in claim 2, wherein the clamping elements each have a shoulder with a shoulder width which, in the inserted position of the clamping unit, engages behind the groove of the first profile bar at least in certain regions.

* * * * *